Jan. 28, 1969  W. C. J. GARRARD ET AL  3,424,407
ACCELERATION LOAD COMPENSATING MECHANISM
Filed March 16, 1966  Sheet 1 of 2
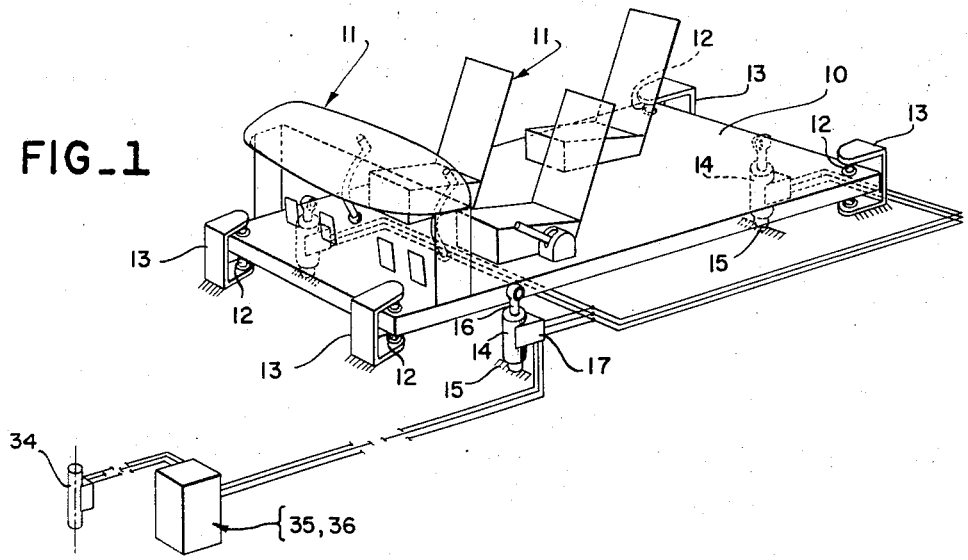
FIG_1
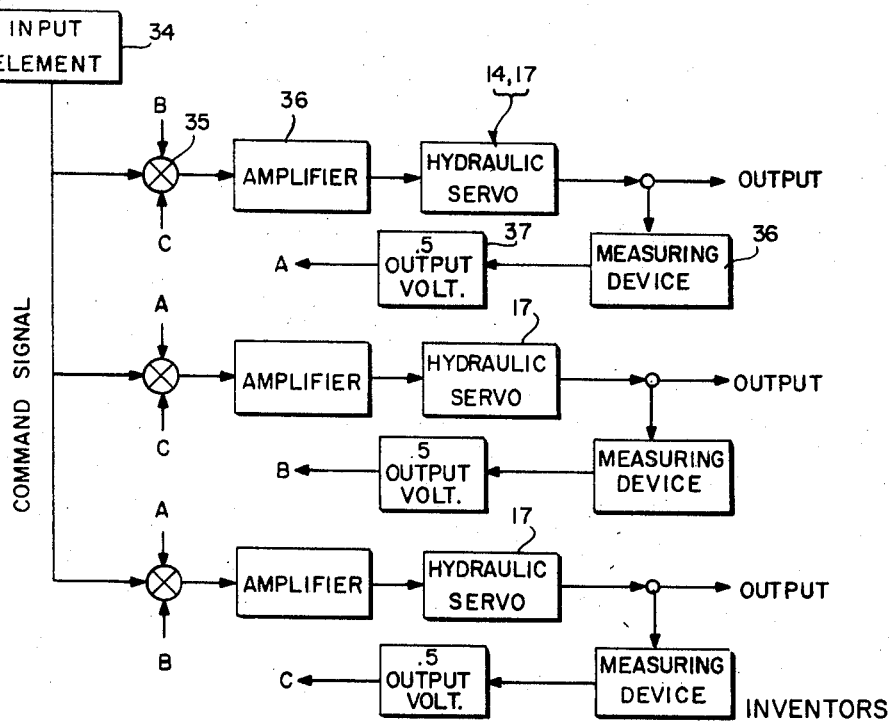
FIG_3
INVENTORS
WILFRED C.J. GARRARD
WILLIAM F. LYNES, SR.
BY George Sullivan
Agent

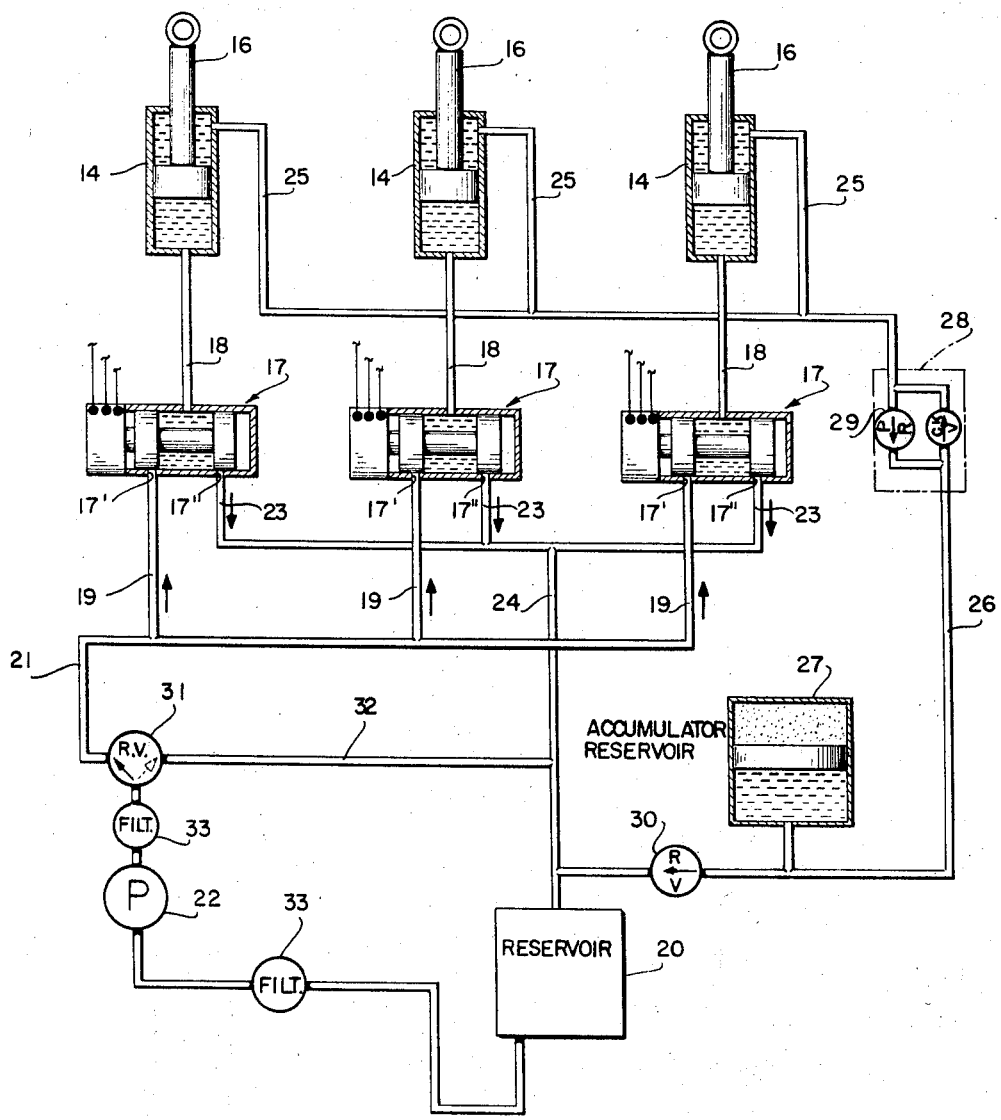
FIG_2

United States Patent Office 3,424,407
Patented Jan. 28, 1969

3,424,407
ACCELERATION LOAD COMPENSATING
MECHANISM
Wilfred C. J. Garrard, Rte. 3, Marietta, Ga. 30060, and
William F. Lynes, Sr., 3380 Forest Hills Road, Powder
Springs, Ga. 30073
Filed Mar. 16, 1966, Ser. No. 534,793
U.S. Cl. 244—118        10 Claims
Int. Cl. B64d 9/00, 11/00; B64c 13/04

ABSTRACT OF THE DISCLOSURE

A mechanism is provided to counteract for both positive and negative acceleration forces imposed on the pilot's compartment in a low altitude, high speed aircraft by irregular air currents through which the aircraft flies and over which the pilot has no control by any movement of the primary or secondary control systems. This is accomplished by a servoed platform that, in its control, anticipates the accelerations that would be felt in the crew compartment and starts movement of the platform in the direction of the accelerations prior to those loads reaching that section of the aircraft.

---

This invention relates in general to acceleration load compensating mechanisms such as employed in vehicles to reduce or eliminate the effect of the force of acceleration on bodies within the vehicle and more particularly to such a mechanism incorporating sensing means responsive to acceleration loads on a body within the vehicle to generate an advanced movement thereof and thereby produce a negating effect.

The present invention contemplates a support for passengers, crew, equipment, etc., on board a vehicle, a mount operative between such support and the vehicle structure by which the former is suspended in position relative to the latter and drive means for the movement of the support prior to and in the direction of acceleration forces acting on the vehicle. In contrast to dampers and cushions heretofore employed for this purpose and which simply absorb acceleration loads as they are applied, the mechanism herein contemplated is designed and adapted to detect such loads prior to their actual application and make necessary corrective adjustments to nullify or substantially lessen the effect thereof when applied. Thus, prior art schemes dealing with acceleration loads attempt to counteract the effect thereof on a protected body rather than to isolate and shield such body from the forces of such loads in the first place as herein proposed.

In relatively high-speed, low-altitude aircraft of present design, for example, passenger and crew discomfort is experienced with velocity changes, in either speed or direction, which produce forces equated to the force of gravity or "G's" as they are commonly called. While these are usually held to tolerable human limits and are not permanently harmful, they can be uncomfortable to the extent of producing blackouts or red-outs causing temporary lapses of control which, although of very short duration, are akin to fainting and which can be dangerous.

The so-called anti-G suit was developed to prevent blackouts, but is effective against positive accelerations only. Actually, the anti-G suit counteracts the effect of positive accelerations rather than to relieve the protected person from such accelerations. In addition, anti-G suits are not always desirable since it is not always practicable to provide individual protection to the occupants. On the contrary, usually it is preferred to provide environmental type of protection whereby the entire passenger and/or crew compartment is relieved of excessive accelerations. This results in greater comfort to the occupants and better protection to the equipment as well as the greater operating efficiency of both.

If such environmental type of protection is to be obtained through conventional cushions and like shock-absorbing devices, the space and area required to permit the necessary relative travel becomes prohibitive. Moreover, the inherent resiliency of these absorbers can aggravate the problem unless snubbed by oil or air-oil devices which further complicates matters.

The instant invention has in view an environmental type of protection fo rthe occupants and equipment of an aircraft against acceleration loads, both positive and negative. The mechanism by which this is accomplished requires a minimum travel length so as to constitute a compact assembly and substantially little or no wasted space in the aircraft. At the same time, this mechanism operates in such a way that G loads acting on the aircraft and applied to or felt by the protected occupants and/or equipment are held well below a predetermined and known tolerable level.

The invention herein proposed recognizes and utilizes the fact that, in the majority of modern aircraft, the crew compartment is located on the longitudinal center line of the aircraft remote from its center of gravity. Acceleration loads applied to the aircraft structure are materially summed at the center of gravity and transmitted through the aircraft structure to the crew compartment. While the time lag between the onset of these loads at the center of gravity and their effect on the crew compartment is slight, it is adequate for the generation of negating movements.

The acceleration sensing means is mounted at, or as near as possible to, the center of gravity and operatively connected to at least one power drive by and through which the protected compartment or platform is attached to the aircraft structure. Each such power drive is responsive to signals from the sensing means corresponding to accelerations or G loading for the operation of the power drive accordingly. The compartment or platform is thereby accelerated in proportion to and in the same direction as the G loading prior to the application of such loading thereon so that when the G or acceleration loads are actually applied they have a substantially lessened effect. In this manner acceleration loads may be applied to the aircraft structure in excess of those normally tolerable to the crew and equipment carried.

With the above and other objects in view as will be apparent this invention consists in the construction, combination and arrangement of parts all as hereinafter more fully described, claimed and illustrated in the accompanying drawings wherein:

FIGURE 1 is a general, isometric view of an acceleration load compensating mechanism designed and constructed in accordance with the teachings of this invention as applied, for example, to the crew compartment of a vehicle showing the floor thereof on which the occupants as well as the control equipment for operation of the vehicle is supported and mounted for limited vertical movement relative to vehicle structure by power actuators, and a control for the operation of such actuators;

FIGURE 2 is a schematic diagram of the hydraulic system by which the actuators illustrated in FIGURE 1 are powered to show the interconnection thereof for integrated operation; and FIGURE 3 is a block diagram of the control by which the power actuators illustrated in FIGURE 2 are operated automatically and as an integrated unit in response to command signals indicating loads to be imposed thereon due to acceleration of the vehicle.

Referring more particularly to the drawings, 10 designates a floor or platform within an aircraft (not shown) on and to which the several accessories 11, such as seats, flight controls, instrument panels, etc., are normally mounted following conventional practice. Thus mounted and disposed, the several accessories 11 constitute an integral part of the platform 10 and are provided with suitable connectors as available within the art to permit their movement with the platform 10 relative to the aircraft without becoming operatively disconnected or giving erroneous signals from or to their associated parts and equipment.

At each of its corners the platform 10 is pierced to receive and accommodate a vertical guide rod 12 which passes therethrough and is mounted at its opposite ends to aircraft structure as, for example, by means of and through a bracket 13. The platform 10 including the accessories 11 carried by it is thereby disposed for free and unrestricted movement vertically within the aircraft while restrained from all other relative movement.

Normally the platform 10 is positioned centrally of the several rods 12, being connected to and supported on one or more hydraulic actuators 14. Preferably, three such actuators 14 are employed, one adjacent each side of the platform 10 near one end thereof and a single actuator 14 at the other end near the center thereof whereby the entire mass is equally distributed on the three actuators or supports 14.

Each hydraulic actuator 14 is anchored at one end to aircraft structure 15 with the other end 16 appropriately connected to the platform 10. The fixed end of each hydraulic actuator 14 has a control in the form of a two-stage, three-way electrically-actuated hydraulic amplifier 17, commonly known as three-way electro-hydraulic or E-H servo valve 17, mounted to it with the valve output port operatively connected, as at 18, to the associated actuator 14. The two external ports, one pressure 17' and one return 17", of the amplifier or valve 17 are connected to a high-pressure primary fluid supply system. For this purpose, identical or tuned supply lines 19 connect each pressure port 17' of the valves 17 to a fluid reservoir 20 through a common line 21 in which a conventional pump 22 is operatively connected. Identical or tuned lines 23 connect each return port 17" of the valves 17 to the reservoir 20 through a common return line 24. Identical or tuned lines 25 connect the opposite end of each actuator 14 to the reservoir 20 through a common line 26.

The several valves 17, in their neutral position, block hydraulic fluid flow to and from the actuators 14 thereby holding the actuators 14 in their normal position with the platform 10 disposed centrally on its guide rods 12 as hereinabove stated. Actuation of the valves 17 in either direction relative to neutral directs the flow of fluid, in one case from the reservoir 20 to the actuators 14 for the extension thereof, and in the other case to the reservoir 20 from the actuators 14 for the contraction thereof. During contraction of the actuators 14, the mass of the platform 10 and its accessories 11 will normally force the fluid from the actuators 14 to the reservoir 20. Extension of the actuators 14 in opposition to gravity is accomplished by pressurizing the fluid in the lines 19 by the pump 22.

Where a powered return stroke during the contraction of the several actuators 14 is desired, the line 26 may incorporate means constituting a low pressure or retraction fluid system. To this end, an accumulator reservoir 27 is operatively connected in the line 26. This accumulator 27 is precharged with a fluid or gas, such as nitrogen, under predetermined pressure which is relatively low compared with that of the primary, high pressure system. Thus, when no pressure is being applied to the cylinders 14 for the extension thereof, the pressure applied through lines 26 and 25 by the accumulator 27 will operate to contract the cylinders in the event that they should strike or otherwise fail to function.

As a safety measure a one-way check valve 28, including a pressure relief bypass 29 therefor, may be incorporated in the line 26 between the accumulator 27 and the several cylinders 14. Also, a conventional pressure relief valve 30 may be provided in the line 26 between the accumulator 27 and the reservoir 20.

A pressure relief valve 31 is also incorporated in the line 21 between the pump 22 and the valves 17. The function of the relief valve 31 is to permit normal passage of fluid to the lines 19 and the valves 17. In the event of blockage or the valves 17 being in null, the fluid will pass through the pressure relief valve 31 into a bypass line 32 and return to the reservoir 20. Thus, the fluid from the reservoir 20 passing through the pump 22 is ineffectually passed through the pressure relief valve 31 and bypass line 32 back to the reservoir 20 in the event that pressure in the lines 19 becomes excessive. A filter 33 of appropriate size and micron rating is incorporated in the line 21 on each side of the pump 22 to protect such operating parts as the valves 17, etc., in the primary system.

In order to coordinate the operation of the several valves 17, a common input signal is employed from a remote sensing element in the form of a vertical accelerometer 34 mounted in appropriate manner to the aircraft at or near the center of gravity. For purposes of illustration only, the accelerometer 34 is located forward of the crew compartment and the platform 10. It could be, and in the majority of cases it is, located aft of the platform 10 since the pilot's compartment is usually forward of the center of gravity.

In any event, vertical accelerations of the aircraft generate output signals (proportional to the acceleration rate) from the accelerometer 34 for operation of the several valves 17 in unison to effect concurrent acceleration of the platform 10 in the same direction. When such accelerations as are transmitted through the aircraft structure actually reach the platform 10, it will have already commenced movement so that the effect thereof will be appreciably less drastic.

To the above ends, the valves 17 are each electrically connected to the accelerometer 34 to receive signals therefrom and to each other individually through summing devices or mixers 35 and amplifiers 36. At the output side of each actuator 14 a linear detection device 36 is provided to pick up movement thereof and convert such movement into corresponding electrical signals. Such signals are fed into a resistor 37 which reduces the signal to half power. These signals are then fed to each of the summing devices 35 associated with the other valves 17 for integration with the signal received thereby from the accelerometer 34. The effective output force from the several valves 17 for movement of the platform 10 is, therefore, uniform and concerted the full equivalent of a single drive.

What is claimed is:

1. An acceleration load compensating mechanism adapted to be interposed between a body within a vehicle and vehicle structure comprising a support for said body, an extensible and contractable mount connected at opposite ends to the otherwise free and unconnected support and said structure, respectively, said mount being normally disposed in an intermediate position, a power drive connected to each side of said mount to forcibly extend and contract it for movement of said support in each direction relative to said structure, and a control for said drive responsive to predetermined forces acting on said vehicle at a selected location remote from and prior to acting on said support to extend and contract said mount corresponding to the direction of the forces on said body whereby said support is moving in the direction of said forces when actually applied thereto.

2. The mechanism of claim 1 including a linear guide carried by said structure and a coacting sliding engagement carried by said support to establish the path of movement of the support during operation of the drive as aforesaid.

3. The mechanism of claim 1 wherein said support includes a platform and said mount includes a plurality of individual hydraulic actuators interconnected one with another for movement in unison upon operation of the drive as aforesaid.

4. The mechanism of claim 3 wherein three said actuators are employed one connected to said support adjacent each side and proximate one end thereof and one connected to said support at the other end near the center thereof.

5. In an aircraft the combination with an internal compartment located on the longitudinal center line remote from the center of gravity of the aircraft, of an acceleration load compensating mechanism between said compartment and aircraft structure comprising at least one power actuator connected at opposite ends to the otherwise free and unconnected compartment and said aircraft structure, said power actuator being normally disposed in an intermediate position to maintain the compartment in a predetermined suspended position in the aircraft, a drive for the operation of each said actuator in either direction and concurrent movement of said compartment relative to said predetermined position, and an accelerometer located in a fixed position proximate the aircraft center of gravity and operatively connected to said drive for the operation thereof as aforesaid.

6. The combination of claim 5 wherein said mechanism includes a plurality of vertically disposed hydraulic actuators, and said drive includes a primary pressure fluid supply system connected to the lower end of each said actuator for the extension thereof, said system including a control operable in one position to direct pressure fluid to each said lower actuator end and operable in the other position to direct fluid out of each said lower actuator end.

7. The combination of claim 6 including a secondary pressure fluid system connected to the upper end of each said actuator for the retraction thereof, said pressure fluid system including a source of fluid pressure less than that of said primary system and a one-way check valve including a pressure relief bypass therefor between said source and each said actuator.

8. The combination of claim 7 wherein said fluid systems are connected to a common fluid reservoir and said secondary system includes a pressurized accumulator and a relief valve between said accumulator and said reservoir to maintain a constant fluid pressure therein.

9. The combination of claim 5 wherein said mechanism includes three hydraulic actuators, a three-way electro-hydraulic control valve individual to each said actuator, each said valve having an output port connected to its actuator and a pair of external ports one connected to a pressurized fluid source and the other to return, a first electrical connection between each said valve and said accelerometer, a second electrical connection between each said valve and the other two valves and a summing device between each said first connection and the second connections.

10. The combination of claim 9 including a linear detection device connected to the output side of each actuator, a resistor connected to each said detection device to receive electrical signals therefrom corresponding to actuator movement and reduce such signals to half power, and a connection between each said resistor and the summing devices associated with the other control valves to integrate the signal received thereby from said accelerometer.

References Cited
UNITED STATES PATENTS

| | | | |
|---|---|---|---|
| 2,672,334 | 3/1954 | Chenery | 244—83 |
| 2,767,942 | 10/1956 | Lucien | 244—83 |
| 2,978,910 | 4/1961 | Aske | 73—515 |
| 2,310,930 | 2/1943 | Blanchett | 60—97 |

MILTON BUCHLER, *Primary Examiner.*

T. W. BUCKMAN, *Assistant Examiner.*

U.S. Cl. X.R.

244—83

UNITED STATES PATENT OFFICE
CERTIFICATE OF CORRECTION

Patent No. 3,424,407　　　　　　　　　　　　　　　　　January 28, 1969

Wilfred C. J. Garrard et al.

It is certified that error appears in the above identified patent and that said Letters Patent are hereby corrected as shown below:

In the heading to the printed specification, lines 4 to 6, "Rte. 3, Marietta, Ga. 30060, and William F. Lynes, Sr., 3380 Forest Hills Road, Powder Springs, Ga. 30073" should read -- Marietta, Ga., and William F. Lynes, Sr., Powder Springs, Ga., assignors to Lockheed Aircraft Corporation, Burbank, California --.

Signed and sealed this 24th day of March 1970.

(SEAL)
Attest:

Edward M. Fletcher, Jr.　　　　　　　　　　　WILLIAM E. SCHUYLER, JR.
Attesting Officer　　　　　　　　　　　　　　　Commissioner of Patents